US011245542B2

(12) United States Patent
Kobayashi et al.

(10) Patent No.: US 11,245,542 B2
(45) Date of Patent: Feb. 8, 2022

(54) INFORMATION PROCESSING APPARATUS AND NON-TRANSITORY COMPUTER READABLE MEDIUM FOR TRANSMITTING INFORMATION BASED ON A DETERMINED SECURITY LEVEL OF THE SURROUNDINGS OF A LOCATION (71) Applicant: FUJIFILM BUSINESS INNOVATION CORP., Tokyo (JP)

(72) Inventors: Tetsuya Kobayashi, Kanagawa (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 12 days.

(21) Appl. No.: 16/845,957

(22) Filed: Apr. 10, 2020

(65) Prior Publication Data
US 2021/0144022 A1 May 13, 2021

(30) Foreign Application Priority Data

Nov. 11, 2019 (JP) .............................. JP2019-204037

(51) Int. Cl.
*H04L 29/06* (2006.01)
*H04L 12/18* (2006.01)
(52) U.S. Cl.
CPC ...... *H04L 12/1822* (2013.01); *H04L 12/1831* (2013.01); *H04L 63/101* (2013.01); *H04L 63/105* (2013.01); *H04L 63/107* (2013.01); *H04L 63/205* (2013.01); *H04L 65/4038* (2013.01)

(58) Field of Classification Search
CPC ..... H04L 63/04; H04L 63/105; H04L 63/107; H04L 63/205; H04L 12/1822; H04L 12/1831; H04L 65/4038
See application file for complete search history.

(56) References Cited

U.S. PATENT DOCUMENTS

| 9,240,996 B1* | 1/2016 | Sinnema | H04L 63/20 |
| 2009/0002743 A1* | 1/2009 | Park | G06K 15/1801 358/1.14 |
| 2015/0121464 A1* | 4/2015 | Hughes, Jr. | H04L 63/08 726/4 |
| 2016/0134839 A1* | 5/2016 | Inomata | H04N 7/152 348/14.09 |
| 2016/0248809 A1* | 8/2016 | Smith | H04L 63/20 |
| 2016/0277638 A1* | 9/2016 | Mochizuki | H04L 63/0245 |

(Continued)

FOREIGN PATENT DOCUMENTS

| JP | 2009-110199 A | 5/2009 |
| JP | 2019-117483 A | 7/2019 |

*Primary Examiner* — Jeong S Park
(74) *Attorney, Agent, or Firm* — Oliff PLC (57) ABSTRACT

An information processing apparatus includes a processor configured to obtain user's surroundings at a usage location where the user uses a service accompanied by communication with another location, determine, based on the obtained surroundings, a security level at the usage location for transmission of a video from the other location to the usage location or a security level at the usage location for transmission of an audio from the other location to the usage location, and determine, based on a determined level, whether to perform video or audio transmission between the usage location and the other location.

20 Claims, 9 Drawing Sheets

(56) References Cited

U.S. PATENT DOCUMENTS

2016/0301960 A1\* 10/2016 Sze .................... H04N 21/6373
2020/0034575 A1\* 1/2020 Wu ......................... G06F 21/74
2021/0081749 A1\* 3/2021 Claire ................. G10L 15/1815

\* cited by examiner

| LEVELS | CONTENTS | MEASURES | AVAILABLE SERVICES |
|---|---|---|---|
| 4 | COMPLETELY SURROUNDED BY WALLS AND CEILING | DISPLAY NORMAL SCREEN | OVERALL SERVICES |
| 3 | WALL HAS WINDOW FAR ENOUGH AWAY FROM MONITOR, AND ONLY SMALL PORTION OF MONITOR SCREEN IS VISIBLE | CHANGE ANGLE OF MONITOR | OFFICE MEETING (INCLUDING CONFIDENTIAL INFORMATION) |
| | | | CONSULTATION ABOUT MEDICINES |
| 2 | WALL HAS WINDOW, AND MONITOR SCREEN IS VISIBLE | REDUCE DISPLAY MAGNIFICATION REDUCE RESOLUTION | MEETING INSIDE OR OUTSIDE OFFICE (NOT INCLUDING CONFIDENTIAL INFORMATION) |
| | | | RECEPTION DESK OF TRAVEL AGENCY |
| 1 | NOT SURROUNDED BY WALLS | TRANSMIT AUDIO INFORMATION THROUGH EARPHONE | AUDIO COMMUNICATION SERVICE |
| | | DISPLAY NORMAL SCREEN | ENGLISH CONVERSATION CLASS |

FIG. 5

| LEVELS | CONTENTS | MEASURES | AVAILABLE SERVICES |
|---|---|---|---|
| 3 | NO SOUND IS HEARD OTHER THAN VOICES OF PEOPLE IN CONFERENCE ROOM | USE NORMAL AUDIO | OVERALL SERVICES |
| 2 | SOUND OTHER THAN VOICES OF PEOPLE IN CONFERENCE ROOM IS SLIGHTLY HEARD | PERMIT TRANSMISSION ONLY THROUGH EARPHONE OR TELEPHONE | CONSULTATION ABOUT MEDICINES |
| | | | OFFICE MEETING (INCLUDING CONFIDENTIAL INFORMATION) |
| | | TURN DOWN VOLUME OF SPEAKER TO PREDETERMINED VOLUME OR LOWER | MEETING INSIDE OR OUTSIDE OFFICE (NOT INCLUDING CONFIDENTIAL INFORMATION) |
| | | | RECEPTION DESK OF TRAVEL AGENCY |
| 1 | SOUND OTHER THAN VOICES OF PEOPLE IN CONFERENCE ROOM IS HEARD | USE NORMAL AUDIO | ENGLISH CONVERSATION CLASS |

INFORMATION PROCESSING APPARATUS AND NON-TRANSITORY COMPUTER READABLE MEDIUM FOR TRANSMITTING INFORMATION BASED ON A DETERMINED SECURITY LEVEL OF THE SURROUNDINGS OF A LOCATION

CROSS-REFERENCE TO RELATED APPLICATIONS

This application is based on and claims priority under 35 USC 119 from Japanese Patent Application No. 2019-204037 filed Nov. 11, 2019.

BACKGROUND

(i) Technical Field

The present disclosure relates to an information processing apparatus and a non-transitory computer readable medium.

(ii) Related Art

Japanese Unexamined Patent Application Publication No. 2009-110199 discloses an information display method including an acquisition step of acquiring information including disclosure level information that indicates an information disclosure level, a comparison step of comparing an information disclosure level that is indicated by disclosure level information, which is included in information obtained in the acquisition step, and a disclosure level of information that may be displayed on a target device, a determination step of determining that display of information is permitted when a comparison result obtained in the comparison step satisfies a predetermined permission condition under which display of information is permitted, and a displaying step of displaying information obtained in the acquisition step when it is determined that display of information is permitted in the determination step.

Japanese Unexamined Patent Application Publication No. 2019-117483 discloses an information processing apparatus that controls display of information to be displayed on a screen and includes a determination unit that determines a location where the information processing apparatus is used, a calculation unit that calculates a degree of risk related to information leak at the location of use of the information processing apparatus determined by the determination unit, and a display unit that hides information to be displayed in accordance with the degree of risk calculated by the calculation unit.

When a service provider provides a service accompanied by video or audio communication via a network to a user, if the confidentiality at the location where the user receives the above service is unknown, concern remains on the provision of video or audio by the service provider.

SUMMARY

Aspects of non-limiting embodiments of the present disclosure relate to providing an information processing apparatus and a non-transitory computer readable medium capable of preventing a video or an audio that is not desired to be disclosed to a third party from leaking to a third party at a usage location by determining the security of the usage location.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to obtain user's surroundings at a usage location where the user uses a service accompanied by communication with another location, determine, based on the obtained surroundings, a security level at the usage location for transmission of a video from the other location to the usage location or a security level at the usage location for transmission of an audio from the other location to the usage location, and determine, based on a determined level, whether to perform video or audio transmission between the usage location and the other location.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings. Note that, in the drawings, components and portions that are the same as each other or that are equivalent to each other are denoted by the same reference signs. In addition, the dimensional ratios in the drawings are exaggerated for convenience of description and may sometimes be different from the actual ratios.

Figure 1:
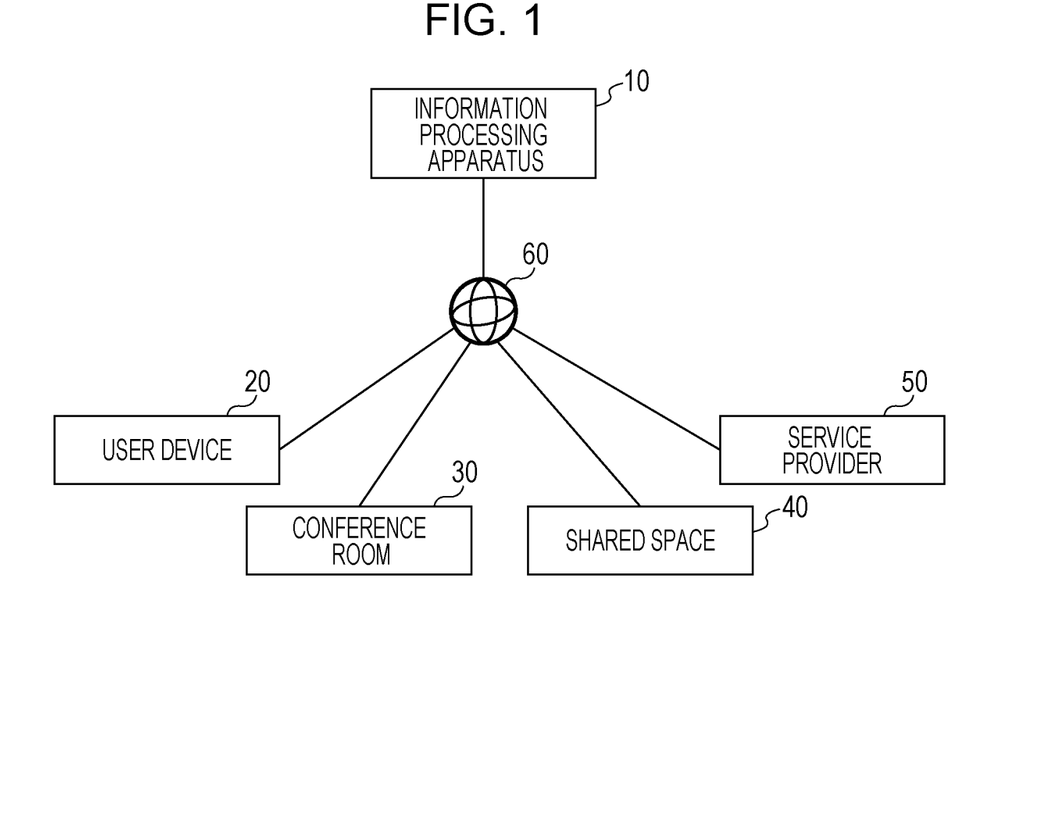
FIG. 1 is a diagram illustrating a schematic configuration of a service providing system according to the present exemplary embodiment.

FIG. 1 is a diagram illustrating a schematic configuration of a service providing system according to the present exemplary embodiment. The service providing system illustrated in FIG. 1 is a system in which transmission and reception of video or audio is performed, via a network 60, between a service provider 50 that provides some services via the network 60 and a user who uses a service provided by the service provider 50. A user uses a user device 20 when the user receives a service from the service provider 50. The user device 20 is, for example, a personal computer, a cellular phone such as a smartphone, or a communication device such as a tablet terminal.

There may be various services that are provided by the service provider 50. Examples of the services include an online conference service for holding conferences, an online conference service for holding conferences that do not include confidential information, a medical consultation service for consulting about medicines to be dispensed, a travel reservation service for making travel proposals and travel reservations, and an online English conversation service for having English conversation lessons. A conference that is held by using an online conference service may or may not include confidential information. In addition, there may be various attributes of users who use the services provided by the service provider 50. Conceivable examples of such user attributes may be a conference participant, a sales representative, an overseas traveler, a pregnant woman, a parent with a small child, and so forth.

When a user uses a service provided by the service provider 50, the user needs to have a network connection at an arbitrary location. The arbitrary location is not limited to a private space such as a home or a hotel room and may be, for example, a conference room provided in a company or the like, a meeting space partitioned by a partition, or a public place such as a restaurant, a coffee shop, or a fast food restaurant. In addition, shared spaces that may be used by making reservations in advance have been becoming popular, and such a shared space may also be the arbitrary location where the user uses the service. Although FIG. 1 illustrates a conference room 30 and a shared space 40, the location where the user receives the service is not limited to these.

When the service provider 50 provides a service, it is very important to determine what type of location a user is located in order to provide the service safely and smoothly. There is a case where the service provider 50 provides an online conference service that handles confidential information. There is another case where, when the service provider 50 provides a medical consultation service, some information regarding medicines to be dispensed need to be strictly managed. When such a service is provided, it is necessary to make sure that there is nobody around a user who receives the service and that nobody other than the user watches a video transmitted by using the service and listens to an audio transmitted by using the service. However, when the user desires to receive the service, if the video or audio is transmitted to the user's location without checking the surroundings of the user's location, there is a possibility of leakage of confidential information.

Accordingly, the service providing system according to the present exemplary embodiment includes an information processing apparatus 10 that determines the security level at the location of a user. The security level is a level that indicates the probability of video or audio, which is transmitted by using a service provided by the service provider 50, being provided to a user without leaking to a third party. The information processing apparatus 10 determines the security level at the location of a user who intends to receive or who is receiving a service provided by the service provider 50 on the basis of video captured at the user's location or sound collected at the user's location. The information processing apparatus 10 determines a security level for video transmission and a security level for audio transmission. The information processing apparatus 10 determines whether transmission of video or audio may be performed by the service provider 50 on the basis of the determination result of the security level at the user's location.

Figure 2:
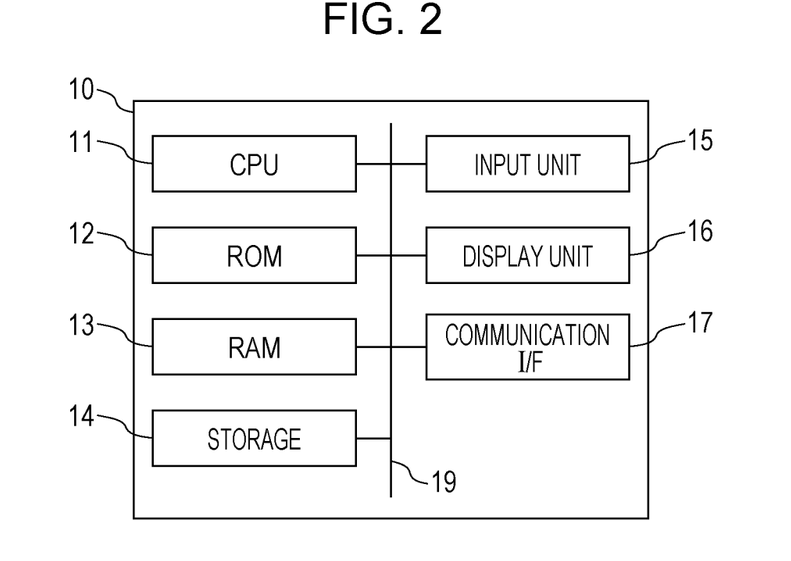
FIG. 2 is a block diagram illustrating a hardware configuration of an information processing apparatus.

FIG. 2 is a block diagram illustrating a hardware configuration of the information processing apparatus 10.

As illustrated in FIG. 2, the information processing apparatus 10 includes a central processing unit (CPU) 11, read only memory (ROM) 12, random access memory (RAM) 13, a storage 14, an input unit 15, a display unit 16, and a communication interface (I/F) 17. These components are connected to one another via a bus 19 so as to be capable of communicating with one another.

The CPU 11 runs various programs and controls each unit. In other words, the CPU 11 reads a program from the ROM 12 or the storage 14 and runs the program by using the RAM 13 as a work area. The CPU 11 performs control of the above-mentioned components and various types of arithmetic processing operations in accordance with programs recorded in the ROM 12 or the storage 14. In the present exemplary embodiment, a security determination program for determining the security level of the location of a user who uses a service is stored in the ROM 12 or the storage 14.

The ROM 12 stores various programs and various data items. The RAM 13 serves as a work area and temporarily stores a program or a data item. The storage 14 is formed of a storage device such as a hard disk drive (HDD), a solid state drive (SSD), or a flash memory and stores various programs including an operating system and various data items.

The input unit 15 includes a pointing device, such as a mouse, and a keyboard and is used for performing various input operations.

The display unit 16 is, for example, a liquid crystal display and displays various information items. The display unit 16 may employ a touch panel method and may function as the input unit 15.

The communication interface 17 is an interface for communicating with another device such as the user device 20 and uses, for example, a standard such as Ethernet (Registered Trademark), FDDI, or Wi-Fi (Registered Trademark).

When running the above-mentioned security determination program, the information processing apparatus 10 obtains various functions by using the above-mentioned hardware resources. A functional configuration that is obtained by the information processing apparatus 10 will be described.

A functional configuration of the information processing apparatus 10 will now be described.

Figure 3:
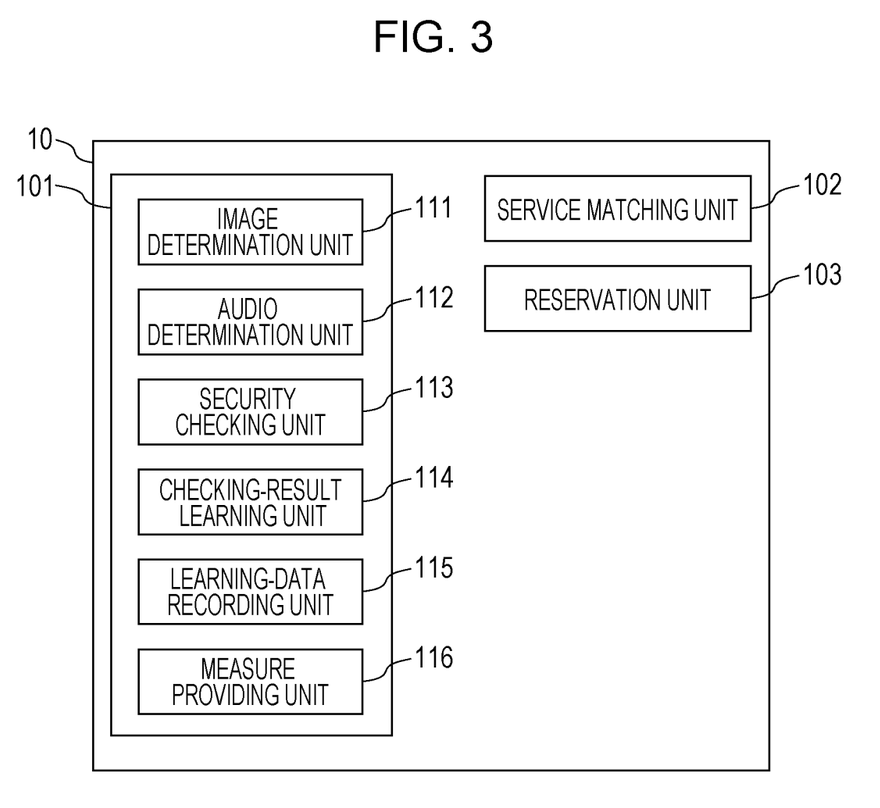
FIG. 3 is a block diagram illustrating an exemplary functional configuration of the information processing apparatus.

FIG. 3 is a block diagram illustrating an exemplary functional configuration of the information processing apparatus 10.

As illustrated in FIG. 3, the information processing apparatus 10 includes, as its functional components, a security determination unit 101, a service matching unit 102, and a reservation unit 103. Each of the functional components is constructed as a result of the CPU 11 reading and running the security determination program stored in the ROM 12 or the storage 14.

The security determination unit 101 determines the security level at the location where a user uses a service, that is, the location of a user who intends to use or who has been using a service provided by the service provider 50. The security determination unit 101 obtains the surroundings of the user's location and determines the security level for transmitting a video to the user's location and the security level for transmitting an audio to the user's location on the basis of the obtained surroundings. As illustrated in FIG. 3, the security determination unit 101 includes an image determination unit 111, an audio determination unit 112, a security checking unit 113, a checking-result learning unit 114, a learning-data recording unit 115, and a measure providing unit 116.

The image determination unit 111 obtains, as the surroundings of the location where a user uses a service, image data that is transmitted from the user's location, and the image determination unit 111 determines the security level for transmitting a video to the user's location by analyzing the obtained image data. The image data may be a still image or may be a moving image. The image determination unit 111 may determine the security level on the basis of machine learning data recorded in the learning-data recording unit 115. The image determination unit 111 may provide the determination result of the security level for the video transmission to the user's location. For example, in the case where a display device, such as a monitor, is installed at the user's location, the image determination unit 111 may cause the display device to display the determination result. Alternatively, for example, in the case where a display device, such as a monitor, is not installed at the user's location, the image determination unit 111 may cause the user device 20 to display the determination result.

More specifically, the image determination unit 111 determines what type of location the user is located from the image data transmitted from the user's location. More specifically, the image determination unit 111 determines whether the user is located in an enclosed space such as a conference room or a shared space, a room with a window, a space partitioned by a partition, an open space without any partition, or the like. The image determination unit 111 determines the security level as relatively higher with increasing the degree of enclosure of the space where the user is located and determines the security level as relatively lower with decreasing the degree of enclosure of the space where the user is located.

In the case where an imaging device such as a camera is fixedly installed at the location of a user, the image determination unit 111 instructs the imaging device to capture an image at the user's location. In contrast, in the case where an imaging device is not fixedly installed at the user's location, the image determination unit 111 instructs the user to capture an image of the user's surroundings by using the user device 20. This instruction for capturing a surrounding image by using the user device 20 may be issued by any method. For example, the image determination unit 111 may cause the user device 20 to display a message that is related to the image capturing instruction or may cause the user device 20 to output an audio that is related to the image capturing instruction.

When the image determination unit 111 determines, from the image data, that there is a blind spot of the camera, the image determination unit 111 may issue an additional instruction for capturing an image of the blind spot. When the image determination unit 111 determines, from the image data, that there is no wall in a captured image, the image determination unit 111 may issue additional instructions for capturing images at the location of the user until the image determination unit 111 detects the existence of a wall.

When it is difficult for the image determination unit 111 to fully determine a security level from image data, a user may capture an image of a room after darkening the room, and the image determination unit 111 may determine the security level from the amount of light coming into the room. For example, the image determination unit 111 may determine the security level by determining the structure of the user's location from the way the light comes in from the outside.

The image determination unit 111 may determine, on the basis of a determination result of a security level, whether to perform video communication between the location of a user and another location, which is different from the user's location, depending on a service provided by the service provider 50.

For example, when a security level that is determined by the image determination unit 111 and the security level that is required for a service provided by the service provider 50 are compared with each other, if the security level determined by the image determination unit 111 is equal to or higher than the security level required for the service, transmission of a video to the user's location is permitted. In contrast, when the security level determined by the image determination unit 111 and the security level required for a service provided by the service provider 50 are compared with each other, if the security level determined by the image determination unit 111 is lower than the security level required for the service, transmission of a video to the user's location is restricted.

The audio determination unit 112 obtains, as the surroundings of the location where a user uses a service, audio data that includes the sound collected for a certain period of time at the user's location and that is transmitted from the user's location. Then, the audio determination unit 112 determines the security level for transmitting an audio to the user's location by analyzing the obtained audio data. The audio determination unit 112 may determine the security level on the basis of the machine learning data recorded in the learning-data recording unit 115. The audio determination unit 112 may provide the determination result of the security level for the audio transmission to the user's location. For example, in the case where a display device, such as a monitor, is installed at the user's location, the audio determination unit 112 may cause the display device to display the determination result. Alternatively, for example, in the case where a display device, such as a monitor, is not installed at the user's location, the audio determination unit 112 may cause the user device 20 to display the determination result.

More specifically, the audio determination unit 112 determines, from the audio data, whether there is a person around the user. More specifically, the audio determination unit 112 determines the security level as relatively higher with decreasing the number of people around the user and determines the security level as relatively lower with increasing the number of people around the user or with increasing the noise around the user.

When audio data is obtained from the location of a user, in the case where a sound collecting device, such as a microphone, is fixedly installed at the user's location, the audio determination unit 112 instructs the sound collecting device to maximize the sound collecting level. In contrast, in the case where a sound collecting device is not fixedly installed at the user's location, the audio determination unit 112 instructs the user to maximize the sound collecting level of a sound collecting device that is included in the user device 20 and then collect sound by using the user device 20. This instruction for collecting sound by using the user device 20 may be issued by any method. For example, the audio determination unit 112 may cause the user device 20 to display a message that is related to the sound collecting instruction or may cause the user device 20 to output an audio that is related to the sound collecting instruction.

The audio determination unit 112 may determine a security level depending on whether there is a difference between the number of people who intend to use or have been using a service at the location of a user and the number of people detected from audio data. For example, assume that a user uses a service for the purpose of holding a conference, and two people intend to participate in the conference held at the user's location. When voices of two people are detected from audio data, the audio determination unit 112 determines the security level as relatively high. In contrast, when voices of three people are detected from the audio data, the audio determination unit 112 determines the security level as relatively low.

The audio determination unit 112 may determine, on the basis of a determination result of a security level, whether to perform audio communication between the location of a user and another location, which is different from the user's location, depending on a service provided by the service provider 50.

For example, when a security level that is determined by the audio determination unit 112 and the security level that is required for a service provided by the service provider 50 are compared with each other, if the security level determined by the audio determination unit 112 is equal to or higher than the security level required for the service, transmission of an audio to the user's location is permitted. In contrast, when the security level determined by the audio determination unit 112 and the security level required for a service provided by the service provider 50 are compared with each other, if the security level determined by the audio determination unit 112 is lower than the security level required for the service, transmission of an audio to the user's location is restricted.

Even if the security level at the location of a user is equal to or higher than the level required for a service when the service provider 50 starts providing the service, there is a possibility that the security level at the user's location will drop later below the level required for the service. Thus, the image determination unit 111 and the audio determination unit 112 may also determine the security level at the user's location even after the service provider 50 has started providing the service. If the security level at the user's location drops below the level required for the service, the image determination unit 111 or the audio determination unit 112 may restrict transmission of a video or an audio to the user's location. If the security level at the user's location drops below the level required for the service, the image determination unit 111 and the audio determination unit 112 may give a predetermined warning to the user.

When it is difficult to determine a security level by the image determination unit 111 or the audio determination unit 112, the security checking unit 113 prompts the service provider 50 to check the security level. The security checking unit 113 sets the security level that is visually or aurally checked by an administrator of the service provider 50 as the security level at the location of a user.

The checking-result learning unit 114 uses image data or audio data that is transmitted from the location of a user and a security level that is checked by the service provider 50 prompted by the security checking unit 113 as teaching data and performs machine learning about determination of a security level. The checking-result learning unit 114 updates the machine learning data recorded in the learning-data recording unit 115 with the results of the machine learning.

For example, assume that a security level that has not been successfully determined by analyzing image data or audio data transmitted from a certain location is checked and determined by an administrator. The checking-result learning unit 114 learns the checking result obtained by the administrator, and this increases the probability that the security determination unit 101 will be capable of performing the security level determination next time by analyzing image data or audio data that is transmitted from the same location or a different location having a similar structure.

There is a possibility that some security levels, which are determination results obtained by the image determination unit 111 or the audio determination unit 112, will not satisfy a security level that is required for a service provided by the service provider 50. When the security level at the location of a user does not satisfy the security level that is required for a service provided by the service provider 50, the measure providing unit 116 provides, as a measure, a method for enabling the service to be provided to the user's location.

Figure 4:
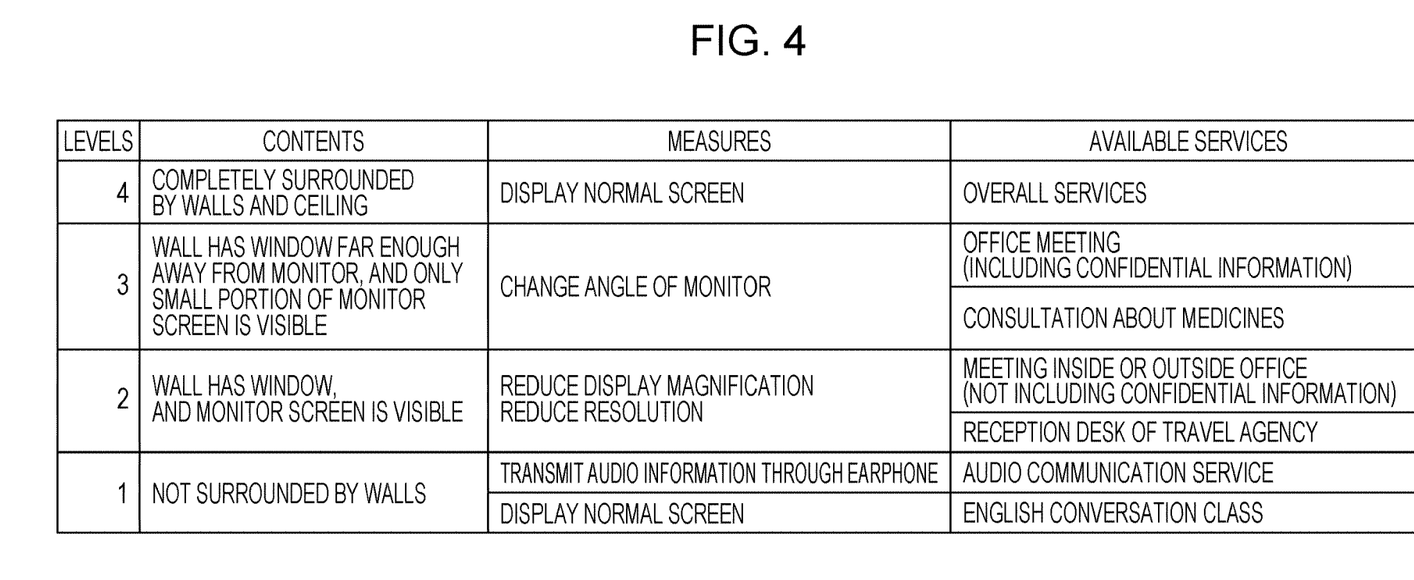
FIG. 4 is a table illustrating examples of information related to a security level for video transmission.

FIG. 4 is a table illustrating examples of information related to a security level for video transmission. In FIG. 4, the higher the numerical value of the level, the higher the security level for video transmission.

For example, when it is found, as a result of analyzing image data, that a user is completely surrounded by walls and a ceiling, the image determination unit 111 determines the security level at the user's location to be level 4. In this case, a service may be provided to the user's location without any change in the user's surroundings.

For example, when it is found, as a result of analyzing image data, that the walls surrounding a user has a window that is far enough away from a monitor, and only a small portion of a screen of the monitor may be visible from the outside of the window, the image determination unit 111 determines the security level at the user's location to be level 3. In this case, the measure providing unit 116 causes the user device 20 to indicate that changing the angle of the monitor enables video transmission to be performed. In addition, conceivable examples of the service that may be provided by the service provider 50 in this case include an office meeting that includes confidential information and a consultation about medicines.

For example, when it is found, as a result of analyzing image data, that the walls surrounding a user has a window, and a screen of a monitor is visible from the outside of the window, the image determination unit 111 determines the security level at the user's location to be level 2. In this case, the measure providing unit 116 causes the user device 20 to indicate that reducing the display magnification or the resolution of the monitor enables video transmission to be performed. In addition, conceivable examples of the service that may be provided by the service provider 50 in this case include a meeting inside or outside an office that does not include confidential information and an operation at a reception desk of a travel agency.

For example, when it is found, as a result of analyzing image data, that a user is not surrounded by walls, the image determination unit 111 determines the security level at the user's location to be level 1. In this case, the measure providing unit 116 causes the user device 20 to indicate that communication using video transmission is not performable, whereas communication only using audio transmission may be performed. A conceivable example of the service that may be provided by the service provider 50 in this case is an audio communication service. In addition, for example, in this case, the measure providing unit 116 causes the user device 20 to indicate that there will be no problem with displaying a normal screen if the service to be provided is a service such as an English conversation lessen that does not handle confidential information.

Measures that are provided by the measure providing unit 116 are not limited to the above examples. For example, the measure providing unit 116 may cause the user device 20 to perform display using a certain color, such as red, so as to notify a user that the screen of the user device 20 is at risk of being peeked. Alternatively, the measure providing unit 116 may reduce the contrast of the screen so as to reduce the risk that information will be peeked. Alternatively, in the case where a confidential document is transmitted, the measure providing unit 116 may perform control such that the confidential document is blacked out and displayed. For example, the measure providing unit 116 may determine whether a document is a confidential document depending on whether a predetermined mark is given to the document.

Figure 5:
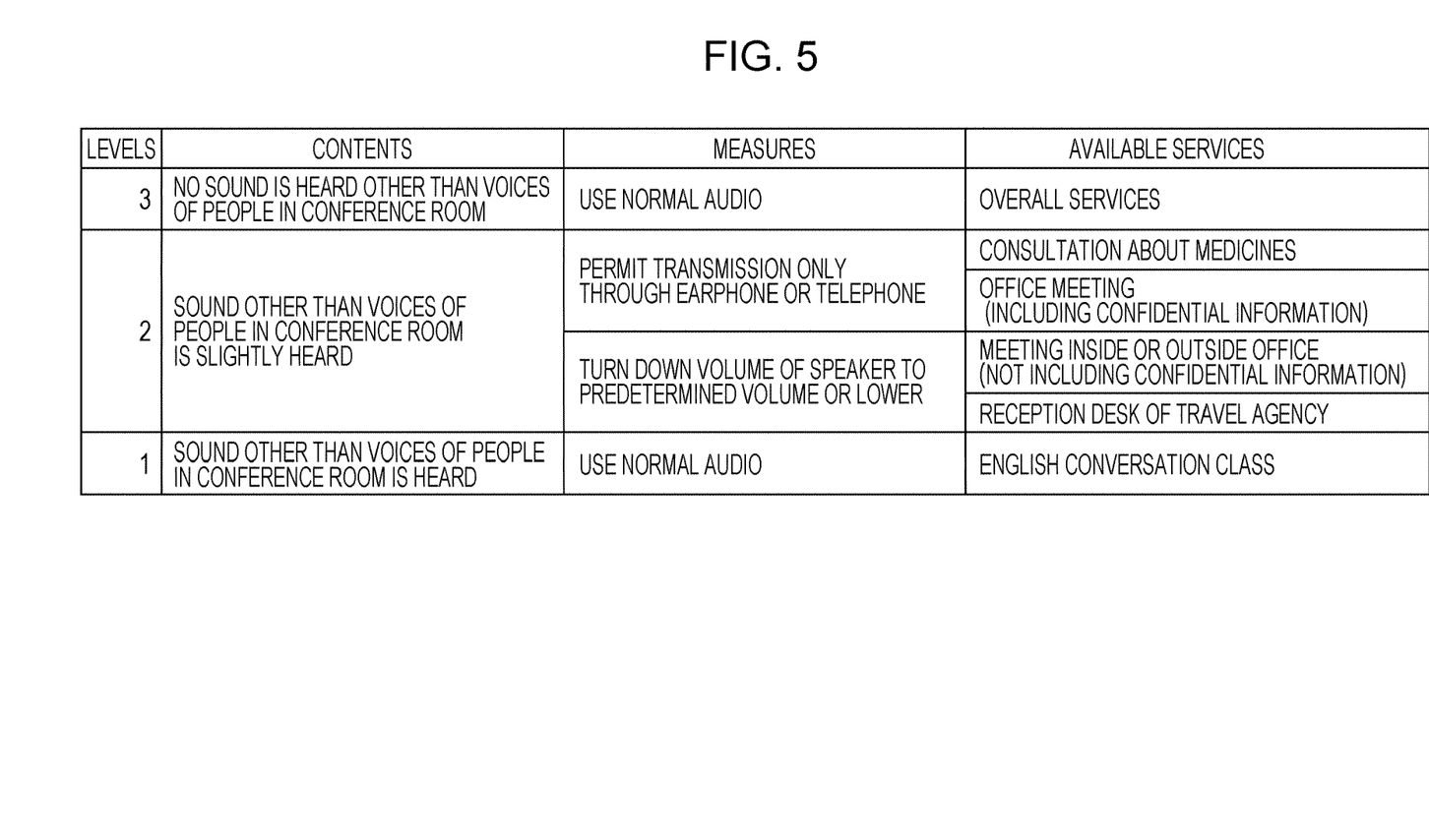
FIG. 5 is a table illustrating examples of information related to a security level for audio transmission.

FIG. 5 is a table illustrating examples of information related to a security level for audio transmission. In FIG. 5, the higher the numerical value of the level, the higher the security level for audio transmission. In the case illustrated in FIG. 5, a user is located in a conference room.

For example, when there is no sound other than voices of people in the conference room, which is the user's location, the audio determination unit 112 determines the security level at the user's location to be level 3. In this case, a service may be provided to the user's location without any change in the user's surroundings. In other words, when the security level for audio transmission is level 3, audio may be output from a speaker.

For example, when sound other than the voices of the people in the conference room is slightly heard, the audio determination unit 112 determines the security level to be level 2. In this case, if an office meeting that includes confidential information is held or if a consultation about medicines is held, the measure presentation unit 116 causes the user device 20 to indicate that a service may be provided only when an earphone or a telephone (including a calling service equivalent to a telephone) is used. In addition, in this case, if a meeting inside or outside an office that does not include confidential information is held or if an operation at a reception desk of a travel agency is performed, the measure presentation unit 116 causes the user device 20 to indicate that a service may be provided only when the volume of a speaker is turned down to a predetermined volume or lower.

For example, when sound other than the voices of the people in the conference room is loudly and frequently heard, the audio determination unit 112 determines the security level to be level 1. In this case, the measure presentation unit 116 causes the user device 20 to indicate that there will be no problem with displaying a normal screen if the service to be provided is a service such as an English conversation lessen that does not handle confidential information. In addition, for example, the measure presentation unit 116 may cause the user device 20 to indicate that the service may be provided by converting an audio into texts and outputting the texts to a screen.

The service matching unit 102 performs a matching between a service provided by the service provider 50 and a user. The service matching unit 102 may perform the matching on the basis of determination results obtained by the image determination unit 111 and the audio determination unit 112. For example, when a service provided by the service provider 50 is an online English conversation system, users of this service are a teacher who teaches English conversation and a student who takes an English conversation lesson.

The reservation unit 103 receives a reservation for using a service provided by the service provider 50 from a user. Information included in a reservation for using a service, the reservation being received by the reservation unit 103, may include the time period when the service is used, the location where the service is used, the number of people who use the service, the contents of the service, and so forth.

Operation of the information processing apparatus 10 will now be described.

Figure 6:
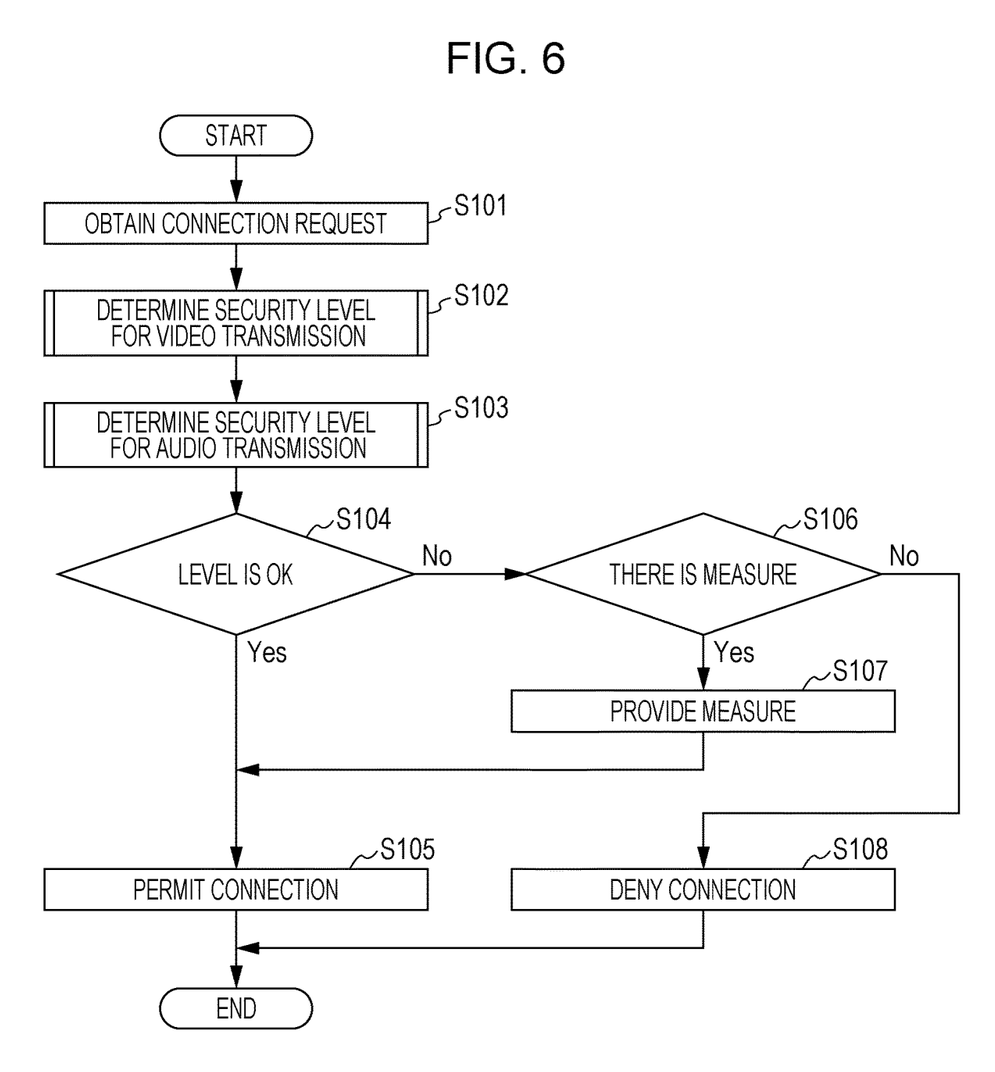
FIG. 6 is a flowchart illustrating a flow of a security determination process that is executed by the information processing apparatus.

FIG. 6 is a flowchart illustrating a flow of a security determination process that is executed by the information processing apparatus 10. The CPU 11 reads the security determination program from the ROM 12 or the storage 14 and runs the program by expanding the program into the RAM 13, so that the security determination process is executed.

First, the CPU 11 obtains a connection request for a service provided by the service provider 50 from the location of a user who intends to use the service (step S101).

Subsequent to step S101, the CPU 11 determines the security level for transmitting a video to the location of the user, who intends to use the service provided by the service provider 50 (step S102).

Subsequent to step S102, the CPU 11 determines the security level for transmitting an audio to the user's location (step S103). Note that the step of determining the security level for video transmission and the step of determining the security level for audio transmission may be performed in reverse order. In addition, the step of determining the security level for video transmission and the step of determining the security level for audio transmission may be performed in parallel with each other by the CPU 11.

Subsequent to step S103, the CPU 11 determines whether the determined security level is equal to or higher than a level that is required for the service provided by the service provider 50 (step S104).

As a result of the determination in step S104, if the determined security level is equal to or higher than the level required for the service provided by the service provider 50 (Yes in step S104), the CPU 11 permits the service provider 50 to make a connection to the user's location. (step S105). The CPU 11 determines, for each of video transmission and audio transmission, whether to permit the service provider 50 to make a connection to the user's location.

In contrast, as a result of the determination in step S104, if the determined security level is lower than the level required for the service provided by the service provider 50 (No in step S104), the CPU 11 determines whether there is a measure for enabling the user to receive the service provided by the service provider 50 (step S106).

If the CPU 11 determines that there is such a measure (Yes in step S106), the CPU 11 provides the measure to the user (step S107). Then, the CPU 11 permits the service provider 50 to make a connection to the user's location (step S105).

The CPU 11 may permit the service provider 50 to make a connection to the user's location on the condition that the user has implemented the measure, or the CPU 11 may permit the service provider 50 to make a connection to the user's location at the user's own risk without waiting until the user implements the measure. For example, when the CPU 11 provides a measure of changing the angle of a monitor installed at the user's location by a predetermined angle by turning the monitor laterally, the CPU 11 obtains the turning angle of the monitor installed at the user's location. Then, the CPU 11 may permit connection to the user's location after the monitor has been actually turned by the predetermined angle or more.

In contrast, if the CPU 11 determines that there is no measure (No in step S106), the CPU 11 does not permit the service provider 50 to make a connection to the user's location (step S108).

Figure 7:
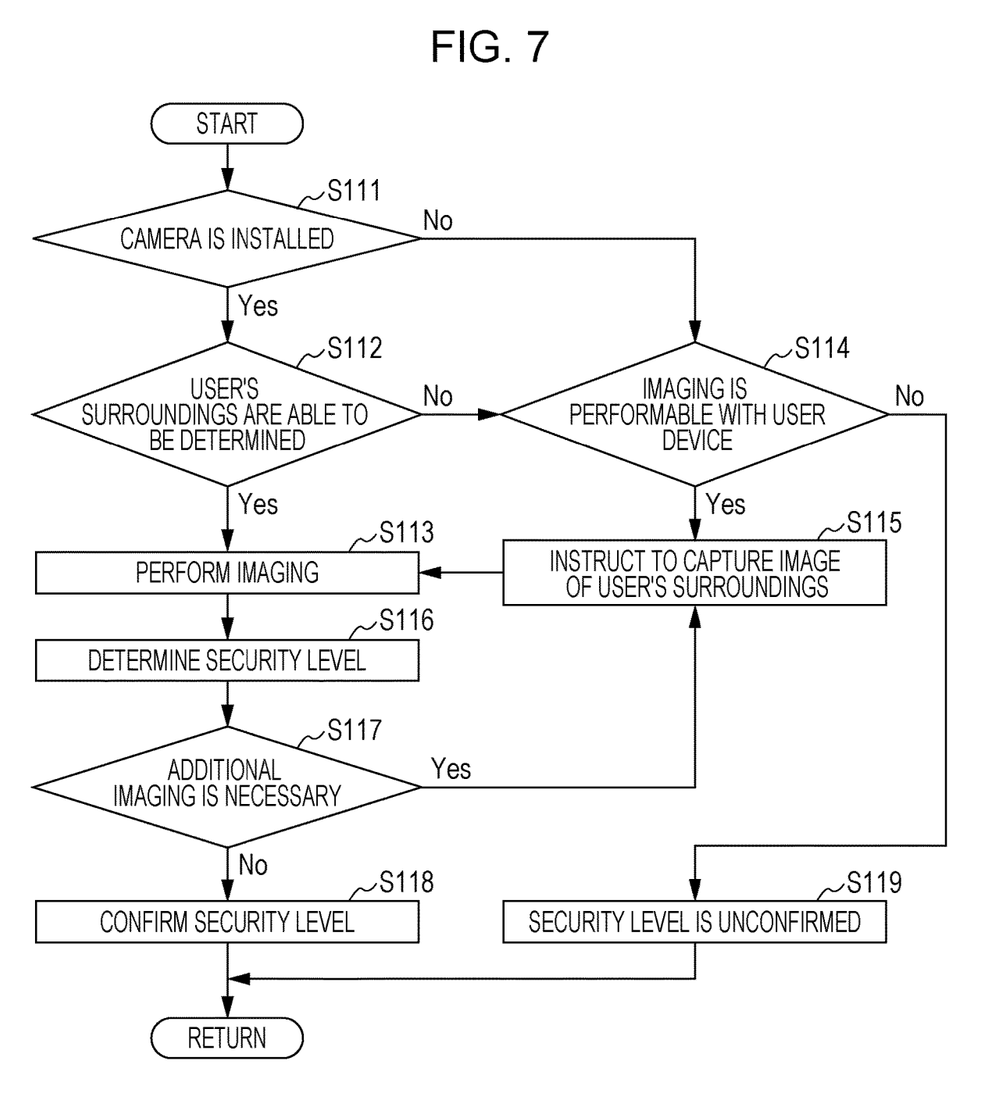
FIG. 7 is a flowchart illustrating a flow of the security determination process executed by the information processing apparatus.

FIG. 7 is a flowchart illustrating a flow of the security determination process executed by the information processing apparatus 10. FIG. 7 illustrates details of the processing for determining the security level for video transmission in step S102 illustrated in FIG. 6.

First, the CPU 11 determines whether a camera is fixedly installed at the user's location (step S111). The CPU 11 may determine whether a camera is fixedly installed from information provided by the user or on the basis of information that is related to the location where the user intends to use the service and that is registered beforehand.

If a camera is fixedly installed at the user's location (Yes in step S111), the CPU 11 determines whether the user's surroundings are able to be determined by an imaging operation that is performed by the camera (step S112). The CPU 11 may determine, from information provided by the user or on the basis of information that is related to the location where the user intends to use the service and that is registered beforehand, whether the user's surroundings are able to be determined by an imaging operation performed by the camera. For example, the CPU 11 may determine whether the user's surroundings may be determined depending on whether information indicating that the orientation of the camera is controllable by the information processing apparatus 10 is registered.

If the user's surroundings are able to be determined by an imaging operation performed by the camera (Yes in step S112), the CPU 11 sends an imaging instruction to the camera (step S113).

If a camera is not fixedly installed at the user's location (No in step S111), or if the user's surroundings are not able to be determined by an imaging operation performed by the camera (No in step S112), the CPU 11 determines whether the user device 20 is capable of capturing an image of the user's surroundings (step S114). The CPU 11 determines, from, for example, information provided by the user, whether the user device 20 is capable of capturing an image of the user's surroundings.

If the user device 20 is capable of capturing an image of the user's surroundings (Yes in step S114), the CPU 11 instructs the user to capture an image of the user's surroundings (step S115). The method of instructing the user to capture an image of the user's surroundings is not particularly limited. For example, the CPU 11 may instruct the user by causing the user device 20 to output a character, an image, or an audio or by causing a monitor that is installed at the user's location to display a character or an image. Alternatively, the CPU 11 may instruct the user or by causing a speaker to output an audio.

The CPU 11 determines, by using image data obtained at the user's location, the security level for transmitting a video to the user's location (step S116).

Subsequent to step S116, the CPU 11 determines whether it is necessary to capture an additional image at the user's location in order to confirm the security level (step S117). For example, the CPU 11 determines whether it is necessary to capture an additional image depending on whether there is a place at the user's location where no image has been captured.

If the CPU 11 determines that it is necessary to capture an additional image at the user's location (Yes in step S117), the CPU 11 instructs the user to capture another image of the user's surroundings (step S115). For example, when a plurality of security levels are determined with image data obtained at the user's location, the CPU 11 determines that it is necessary to capture an additional image at the user's location. In contrast, if the CPU 11 determines that additional imaging at the user's location is not necessary (No in step S117), the CPU 11 confirms the security level for transmitting a video to the user's location (step S118).

In contrast, as a result of the determination in step S114, if the user device 20 is not capable of capturing an image of the user's surroundings (No in step S114), the CPU 11 does not confirm the security level for transmitting a video to the user's location (step S119). If the security level for transmitting a video to the user's location is not confirmed, the CPU 11 may restrict transmission of a video to the location. Alternatively, if the security level for transmitting a video to the user's location is not confirmed, the CPU 11 may prompt the user to check if there is no problem in transmitting a video to the location.

Figure 8:
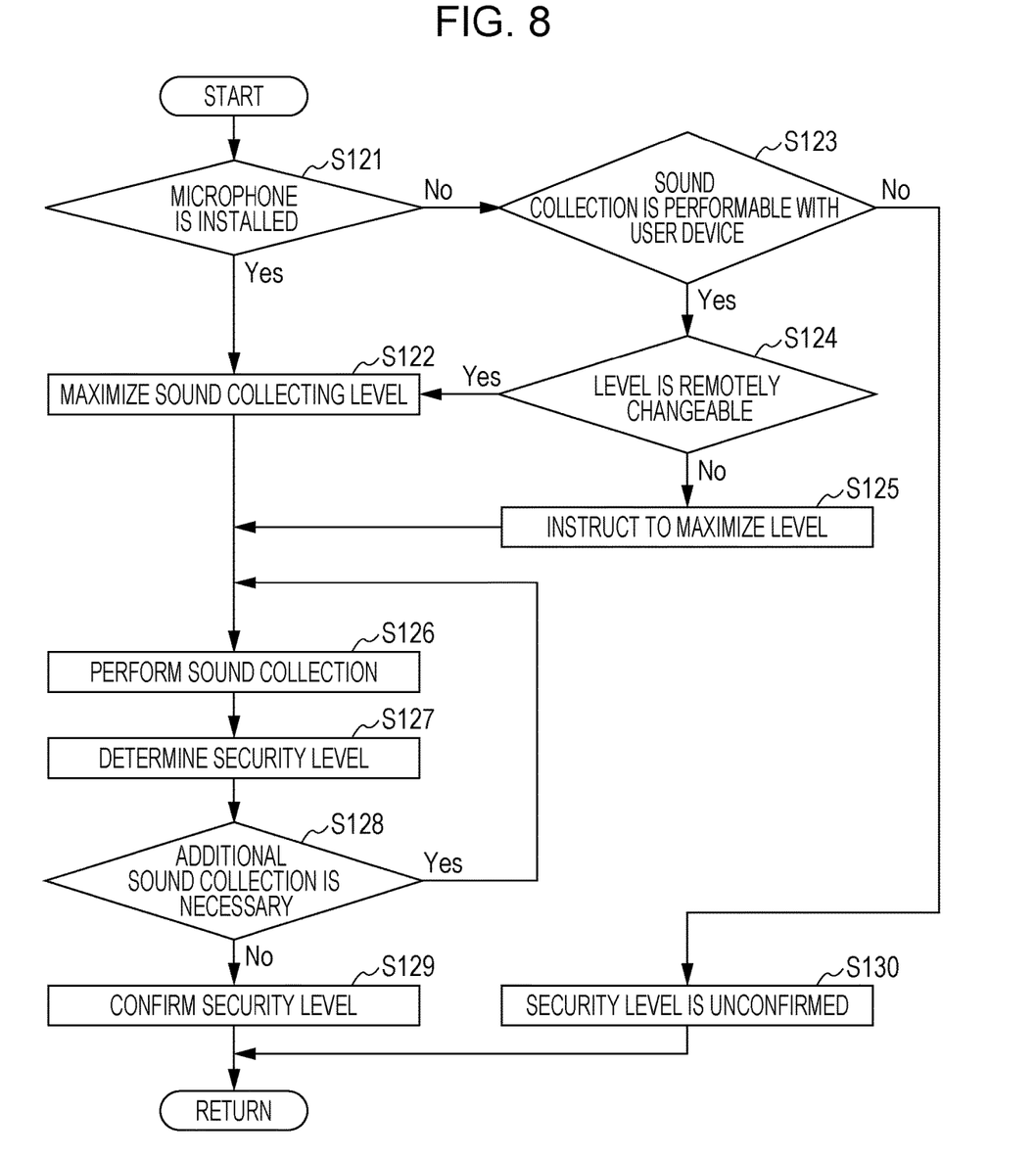
FIG. 8 is a flowchart illustrating a flow of the security determination process executed by the information processing apparatus.

FIG. 8 is a flowchart illustrating a flow of the security determination process executed by the information processing apparatus 10. FIG. 8 illustrates details of the processing for determining a security level for audio transmission in step S103 illustrated in FIG. 6.

First, the CPU 11 determines whether a microphone is fixedly installed at the user's location (step S121). The CPU 11 may determine whether a microphone is fixedly installed from information provided by the user or on the basis of information that is related to the location where the user intends to use the service and that is registered beforehand.

If a microphone is fixedly installed at the user's location (Yes in step S121), the CPU 11 maximizes the sound collecting level of the microphone (step S122).

In contrast, if a microphone is not fixedly installed at the user's location (No in step S121), the CPU 11 determines whether the user device 20 is capable of collecting sound around the user (step S123). The CPU 11 determines whether the user device 20 is capable of collecting sound around the user from information provided by the user.

If the user device 20 is capable of collecting sound around the user (Yes in step S123), the CPU 11 determines whether the sound collecting level of a microphone included in the user device 20 may be remotely maximized (step S124). For example, the CPU 11 may perform the determination in step S124 depending on whether the sound collecting level of the microphone of the user device 20 is permitted to be changed from the outside.

If the sound collecting level of the microphone of the user device 20 may be remotely maximized (Yes in step S124), the CPU 11 maximizes the sound collecting level of the microphone (step S122). In contrast, if the sound collecting level of the microphone of the user device 20 is not able to be remotely maximized (No in step S124), the CPU 11 instructs the user to maximize the sound collecting level of the microphone of the user device 20 (step S125). For example, the CPU 11 may instruct the user by causing the user device 20 to output a character, an image, or an audio or by causing a monitor that is installed at the user's location to display a character or an image. Alternatively, the CPU 11 may instruct the user by causing a speaker to output an audio.

Then, the CPU 11 causes the microphone to collect sound around the user (step S126).

Subsequent to step S126, the CPU 11 determines, by using audio data that includes the sound collected at the user's location, the security level for transmitting an audio to the user's location (step S127).

Subsequent to step S127, the CPU 11 determines whether it is necessary to additionally collect sound at the user's location in order to confirm the security level (step S128).

If the CPU 11 determines that it is necessary to additionally collect sound at the user's location (Yes in step S128), the process returns to step S126, and the CPU 11 causes the microphone to collect sound around the user again. For example, when a plurality of security levels are determined with audio data including the sound collected at the user's location, the CPU 11 determines that it is necessary to additionally collect sound at the user's location. In contrast, if the CPU 11 determines that additional sound collection at the user's location is not necessary (No in step S128), the CPU 11 confirms the security level for transmitting an audio to the user's location (step S129).

In contrast, as a result of the determination in step S123, if the user device 20 is not capable of collecting sound around the user (No in step S123), the CPU 11 does not confirm the security level for transmitting an audio to the user's location (step S130). If the security level for transmitting an audio to the user's location is not confirmed, the CPU 11 may restrict transmission of an audio to the location. Alternatively, if the security level for transmitting an audio to the user's location is not confirmed, the CPU 11 may prompt the user to check if there is no problem in transmitting an audio to the location.

Figure 9:
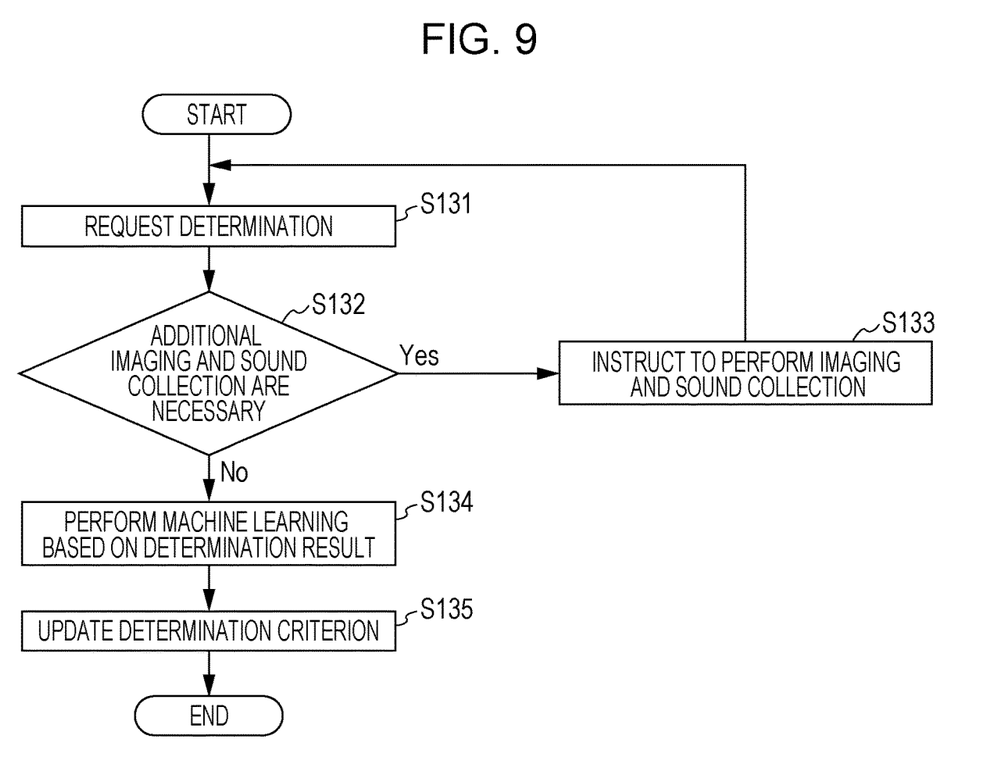
FIG. 9 is a flowchart illustrating a flow of the security determination process executed by the information processing apparatus.

FIG. 9 is a flowchart illustrating a flow of the security determination process executed by the information processing apparatus 10. FIG. 9 illustrates details of the processing that is performed by the information processing apparatus 10 for learning a determination result of a security level.

When a security level is not successfully determined from image data and audio data obtained at the location of a user, the CPU 11 requests the service provider 50 to check the security level (step S131). The requesting method is not particularly limited.

Subsequent to step S131, the CPU 11 determines whether the service provider 50 has determined that additional imaging or additional sound collection is necessary in order to confirm the security level (step S132).

If the service provider 50 determines that additional imaging or additional sound collection is necessary (Yes in step S132), the CPU 11 instructs a camera to perform an imaging operation at the user's location or instructs a microphone to collect sound at the user's location (step S133). When a camera has performed an imaging operation after receiving the imaging instruction or when a microphone has collected sound after receiving the sound collecting instruction, the process returns to step S131, and the CPU 11 requests the service provider 50 to check the security level again.

In contrast, if the service provider 50 determines that additional imaging or additional sound collection is not necessary (No in step S132), the service provider 50 determines the security level. The CPU 11 obtains the result of the security level determination performed by the service provider 50 and performs machine learning by using the image data or the audio data and the determination result of the security level as teaching data (step S134).

Subsequent to step S134, the CPU 11 updates the learning data with the results of the machine learning (step S135).

In the above-described case, the CPU 11 determines the security level at the location of a user when the user starts using a service. If the location where the user uses the service is known beforehand, the CPU 11 may determine the security level at the location where the user uses the service before the service is provided to the user.

For example, when a user makes a reservation for the shared space 40 in order to use a service, the CPU 11 may determine beforehand the security level of the shared space 40. Then, when the security level of the shared space 40 is lower than the security level required by the service to be provided to the user, the CPU 11 may notify the user that the security level of the shared space 40 is low.

An example of a user interface that is provided by the information processing apparatus 10 will now be described.

Figure 10:
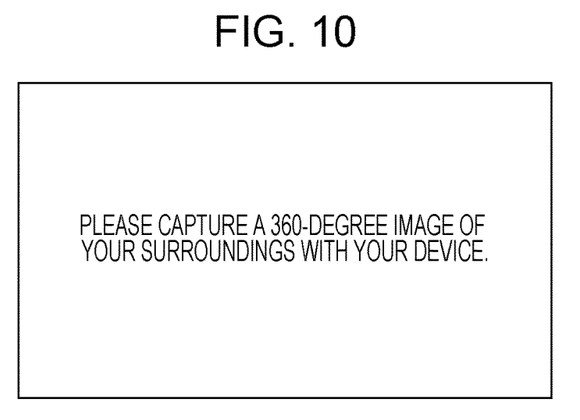
FIG. 10 is a diagram illustrating an example of a user interface that is provided by the information processing apparatus.

FIG. 10 is a diagram illustrating an example of a user interface that is provided by the information processing apparatus 10. FIG. 10 illustrates an example of a message that is displayed on, for example, a monitor installed at the location of a user or the user device 20 used by the user when the user is instructed to capture an image of the user's surroundings in step S115 illustrated in FIG. 7.

Figure 11:
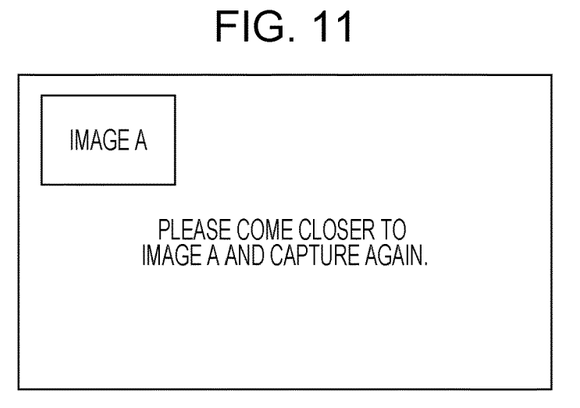
FIG. 11 is a diagram illustrating an example of the user interface provided by the information processing apparatus.

FIG. 11 is a diagram illustrating an example of the user interface provided by the information processing apparatus 10. FIG. 11 illustrates an example of a message that is displayed on, for example, a monitor installed at the location of a user or the user device 20 used by the user when the CPU 11 determines that additional imaging is necessary in step S117 illustrated in FIG. 7.

Figure 12:
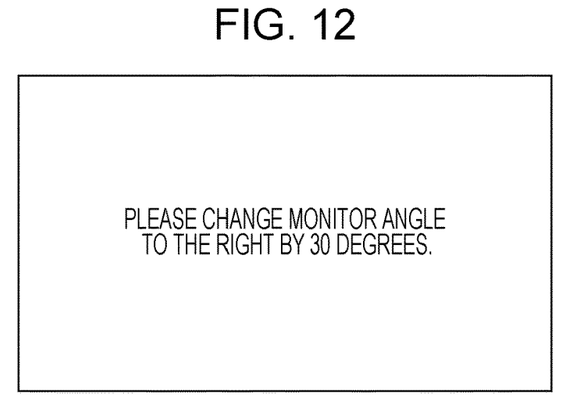
FIG. 12 is a diagram illustrating an example of the user interface provided by the information processing apparatus.

FIG. 12 is a diagram illustrating an example of the user interface provided by the information processing apparatus 10. FIG. 12 illustrates an example of a message that is displayed on, for example, a monitor installed at the location of a user or the user device 20 used by the user when a measure is provided in step S107 illustrated in FIG. 6.

Note that, although the CPU 11 executes the security determination process by reading software (a program) in the above-described embodiment, various processors other than the CPU 11 may execute the security determination process. Examples of the processors in this case include a programmable logic device (PLD) such as a field-programmable gate array (FPGA), which has a circuit configuration that is changeable after being manufactured and a dedicated electrical circuit such as an application specific integrated circuit (ASIC), which is a processor having a circuit configuration designed for execution of a specific process. In addition, the security determination process may be executed by one of these various processors or may be executed by a combination of two or more processors of the same type or different types (e.g., a plurality of FPGAs, a combination of a CPU and an FPGA, and the like). More specifically, the hardware structures of these various processors are each an electrical circuit in which circuit elements including a semiconductor element are combined.

In the above embodiment, although an aspect has been described in which the program for the security determination process is stored (installed) beforehand in the ROM 12 or the storage 14, the present disclosure is not limited to this. The program may be provided by being recorded in a recording medium such as a compact disc read-only memory (CD-ROM), a digital versatile disc read-only memory (DVD-ROM), or a universal serial bus (USB) memory.

Alternatively, the program may be downloaded from an external device via a network.

The operations of the processor in the above-described embodiment may be performed by a single processor or may be performed by a plurality of processors at physically separated locations cooperating with each other. In addition, the order in which the operations of the processor are performed is not limited to the order described in the above embodiment and may be suitably changed.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        obtain, from a user device disposed at a first location, surroundings information of a user at the first location, which is where the user uses a service accompanied by communication with a service provider at a second location;
        make a first determination of a first security level at the first location for transmission of a video from the second location to the first location, the first security level being based on the obtained surroundings information, which is obtained by using image data detected at the first location;
        make a second determination of a second security level at the first location for transmission of audio from the second location to the first location, the second security level being based on the obtained surroundings information, which is obtained by using audio data collected at the first location, the first determination being different from the second determination;
        determine, based on the determined first security level, whether to perform video transmission between the first location and the second location; and
        determine, based on the determined second security level, whether to perform audio transmission between the first location and the second location.

2. The information processing apparatus according to claim 1,
    wherein the processor is further configured to determine whether to perform video and audio communications between the first location and the second location based on a security level that is required for the service.

3. The information processing apparatus according to claim 2,
    wherein the security level required for the service is determined for each of video transmission and audio transmission.

4. The information processing apparatus according to claim 2,
    wherein a security level varies depending on the service.

5. The information processing apparatus according to claim 3,
    wherein a security level varies depending on the service.

6. The information processing apparatus according to claim 1,
    wherein the processor is further configured to output an obtaining instruction for obtaining the surroundings information of the user at the first location in accordance with an installation state of an imaging device at the first location.

7. The information processing apparatus according to claim 6,
    wherein, when an imaging device is not installed at the first location, the processor is further configured to output as the obtaining instruction, an instruction to the user for capturing an image of the surroundings information of the user by using a device owned by the user.

8. The information processing apparatus according to claim 7,
    wherein, when a sound collecting device is not installed at the first location, the processor is further configured to output as the obtaining instruction, an instruction to the user for collecting sound around the user by using the user device.

9. The information processing apparatus according to claim 1,
    wherein the processor is further configured to output an obtaining instruction for obtaining the surroundings information of the user at the first location in accordance with an installation state of a sound collecting device at the first location.

10. The information processing apparatus according to claim 1,
    wherein the processor is further configured to determine a security level for video transmission by performing image recognition processing on a video transmitted from the first location.

11. The information processing apparatus according to claim 10,
    wherein, when a security level for video transmission is equal to or higher than a predetermined threshold, the processor is further configured to transmit a video from the second location to the first location.

12. The information processing apparatus according to claim 11,
    wherein, when a security level for video transmission is lower than a predetermined threshold, the processor is further configured to provide a method for enabling a video to be transmitted from the second location to the first location.

13. The information processing apparatus according to claim 1,
    wherein the processor is further configured to determine a security level for video transmission by performing audio recognition processing on an audio transmitted from the first location.

14. The information processing apparatus according to claim 1,
wherein, when a security level for audio transmission is equal to or higher than a predetermined threshold, the processor is further configured to transmit an audio from the second location to the first location.

15. The information processing apparatus according to claim 14,
wherein, when a security level of audio transmission is lower than a predetermined threshold, the processor is further configured to provide a method for enabling audio to be transmitted from the second location to the first location.

16. The information processing apparatus according to claim 1,
wherein, when a security level at the first location is lower than a predetermined threshold, the processor is further configured to stop execution of the service.

17. The information processing apparatus according to claim 1,
wherein, even after execution of the service has been started, the processor is further configured to stop the execution of the service when a security level at the first location drops below a predetermined threshold.

18. The information processing apparatus according to claim 1,
wherein, even after execution of the service has been started, the processor is further configured to provide a warning when a security level at the first location drops below a predetermined threshold.

19. The information processing apparatus according to claim 1,
wherein a security level varies depending on the service.

20. A non-transitory computer readable medium storing a program causing a computer to execute a process, the process comprising:
obtaining, from a user device disposed at a first location, surroundings information of a user at the first location, which is where the user uses a service accompanied by communication with a service provider at a second location;
making a first determination of a first security level at the first location for transmission of a video from the second location to the first location, the first security level being based on the obtained surroundings information, which is obtained by using image data detected at the first location;
making a second determination of a second security level at the first location for transmission of audio from the second location to the first location, the second security level being based on the obtained surroundings information, which is obtained by using audio data collected at the first location, the first determination being different from the second determination;
determining, based on the determined first security level, whether to perform video transmission between the first location and the second location; and
determining, based on the determined second security level, whether to perform audio transmission between the first location and the second location.

* * * * *